(12) United States Patent
Park et al.

(10) Patent No.: US 12,656,858 B2
(45) Date of Patent: Jun. 16, 2026

(54) TRANSPARENT DISPLAY DEVICE

(71) Applicant: LG ELECTRONICS INC., Seoul (KR)

(72) Inventors: Jinyung Park, Seoul (KR); Jongyoon Ahn, Seoul (KR); Younkyung Lee, Seoul (KR); Minyoung Jo, Seoul (KR); Chulbae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/116,657

(22) PCT Filed: Sep. 30, 2022

(86) PCT No.: PCT/KR2022/014807
§ 371 (c)(1),
(2) Date: Mar. 28, 2025

(87) PCT Pub. No.: WO2024/071488
PCT Pub. Date: Apr. 4, 2024

(65) Prior Publication Data
US 2026/0104753 A1     Apr. 16, 2026

(51) Int. Cl.
*G06F 3/01* (2006.01)
*G06F 3/14* (2006.01)
*G09G 5/10* (2006.01)

(52) U.S. Cl.
CPC .............. *G06F 3/011* (2013.01); *G06F 3/14* (2013.01); *G09G 5/10* (2013.01)

(58) Field of Classification Search
CPC . G06F 3/14; G06F 3/147; G06F 3/011; G09G 5/10
See application file for complete search history.

(56) References Cited

U.S. PATENT DOCUMENTS 6,388,951 B1 * 5/2002 Matsumoto ............ G04G 11/00
                                                368/29
9,367,153 B2 * 6/2016 Shin ...................... F25D 29/005
(Continued)

FOREIGN PATENT DOCUMENTS

CN        103489412        1/2014
CN        112356643        2/2021
(Continued)

OTHER PUBLICATIONS

PCT International Application No. PCT/KR2022/014807, International Search Report dated Jun. 22, 2023, 6 pages.
(Continued)

*Primary Examiner* — Patrick F Marinelli
(74) *Attorney, Agent, or Firm* — LEE, HONG, DEGERMAN, KANG & WAIMEY

(57) ABSTRACT

An objective of the present disclosure is to adjust the degree of light-shielding of a transparent display according to a surrounding situation. A transparent display device according to an embodiment of the present disclosure includes a transparent display, a camera, and a controller configured to recognize a user located in front of the transparent display on the basis of an image captured through the camera and increase in transparency of the transparent display when an absence of the user is sensed during a first time after the recognition of the user.

10 Claims, 18 Drawing Sheets

(56)  References Cited

U.S. PATENT DOCUMENTS

| | | | | |
|---|---|---|---|---|
| 10,223,956 | B2* | 3/2019 | Yoo | G09G 5/003 |
| 10,732,729 | B2* | 8/2020 | Yun | G09G 3/20 |
| 10,802,274 | B2* | 10/2020 | Tsai | G09G 5/10 |
| 11,494,012 | B2* | 11/2022 | Lee | G06F 3/041 |
| 11,828,947 | B2* | 11/2023 | Park | B60K 35/50 |
| 11,921,920 | B2* | 3/2024 | Grzesiak | G02B 27/0093 |
| 11,994,790 | B2* | 5/2024 | Guo | G02F 1/13312 |
| 12,187,410 | B2* | 1/2025 | Thornton | G02B 27/01 |
| 12,315,412 | B2* | 5/2025 | Nishio | G06F 3/012 |
| 12,367,851 | B2* | 7/2025 | Nishio | G06V 40/161 |
| 12,519,903 | B2* | 1/2026 | Peterson | H04N 7/15 |
| 2014/0035850 | A1* | 2/2014 | Shin | F25D 29/005 |
| | | | | 345/173 |
| 2014/0347267 | A1* | 11/2014 | Nishi | G06F 3/013 |
| | | | | 345/156 |
| 2017/0148376 | A1* | 5/2017 | Yoo | G09G 3/20 |
| 2018/0217678 | A1* | 8/2018 | Yun | G09G 3/3208 |
| 2018/0374451 | A1* | 12/2018 | Kang | G09G 5/10 |
| 2019/0042015 | A1* | 2/2019 | Lee | G06F 3/041 |
| 2019/0113965 | A1* | 4/2019 | Kumar | G06F 3/147 |
| 2020/0288081 | A1* | 9/2020 | Devendran | H04N 5/57 |
| 2021/0027688 | A1* | 1/2021 | Rao | G09G 3/20 |
| 2021/0200295 | A1* | 7/2021 | Ha | G06F 21/84 |
| 2022/0147168 | A1* | 5/2022 | Lee | G06F 3/041 |
| 2022/0413608 | A1* | 12/2022 | Grzesiak | G02B 27/0093 |
| 2023/0278693 | A1* | 9/2023 | Thornton | B64D 45/00 |
| | | | | 715/781 |
| 2023/0359468 | A1* | 11/2023 | Sivagnanenthirarajah | |
| | | | | G06V 40/166 |
| 2023/0411361 | A1* | 12/2023 | Moran | G06F 3/0412 |
| 2024/0321163 | A1* | 9/2024 | Nishio | G06V 40/161 |
| 2024/0321236 | A1* | 9/2024 | Nishio | G06T 7/70 |
| 2025/0191502 | A1* | 6/2025 | Nakamori | G06V 20/20 |

FOREIGN PATENT DOCUMENTS

| | | |
|---|---|---|
| JP | 2015-079201 | 4/2015 |
| KR | 10-2009-0075326 | 7/2009 |
| KR | 10-2016-0107055 | 9/2016 |
| KR | 10-2231587 | 3/2021 |
| KR | 10-2022-0091854 | 7/2022 |

OTHER PUBLICATIONS

European Patent Office Application Serial No. 22961089.4, Search Report dated Aug. 22, 2025, 9 pages.
Korean Intellectual Property Office Application No. 10-2025-7010316, Office Action dated Oct. 26, 2025, 22 pages.

* cited by examiner

100

Morning time -> Noon
Winter -> Summer

TRANSPARENT DISPLAY DEVICE

CROSS-REFERENCE TO RELATED APPLICATION(S)

This application is the National Stage filing under 35 U.S.C. 371 of International Application No. PCT/KR2022/014807, filed on Sep. 30, 2022, the contents of which is hereby incorporated by reference herein in its entirety.

TECHNICAL FIELD

The present disclosure relates to a transparent display device.

BACKGROUND ART

Information displays are evolving into new forms as technologies advance. Among them, transparent display devices have a unique advantage of being able to display information as a background.

The transparent display devices display information on a transparent screen by utilizing properties of transmitting light.

As the transparent display devices become more popular, the transparent display devices are expected to provide users with new interfaces when combined with contents such as augmented reality.

Although there have been many prior technologies for controlling transmittance of the transparent displays, there is no technology for controlling the transmittance optimized for TV viewing scenes.

DISCLOSURE OF THE INVENTION

Technical Problem

An objective of the present disclosure is to adjust a degree of light blocking of a transparent display depending on surrounding conditions.

An objective of the present disclosure is to recognize a user located in front of a transparent display so as to adjust transparency of the transparent display depending on an absence of the user.

An objective of the present disclosure is to adjust transparency of a transparent display depending on a direction and time zone of the transparent display.

An objective of the present disclosure is to adjust transparency of a long image displayed on a transparent display.

Technical Solution

A transparent display device according to an embodiment of the present disclosure includes a transparent display, a camera, and a controller configured to recognize a user located in front of the transparent display on the basis of an image captured through the camera and increase in transparency of the transparent display when an absence of the user is sensed during a first time after the recognition of the user.

A method for operating a transparent display device according to an embodiment of the present disclosure includes recognizing a user located in front of a transparent display on the basis of an image captured by a camera, and increasing in transparency of the transparent display when an absence of the user is sensed during a first time after the recognition of the user.

Advantageous Effects

According to the embodiment of the present disclosure, the light blocking of the transparent display may be automatically adjusted depending on the presence or absence of the user located in front of the transparent display. Thus, the usability of the transparent display 500 may increase, and the user experience may be improved.

According to the embodiment of the present disclosure, the degree of the light blocking may vary depending on the direction, in which the transparent display device is placed, the time zone, and the season to prevent the view from being obstructed by the sunlight.

According to the embodiment of the present disclosure, the transparency of the logo area may increase so as not to disturb the user's viewing. In addition, as the transparency of the logo area increases, the burn-in of the corresponding transparent OLED pixels may be prevented.

MODE FOR CARRYING OUT THE INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, may have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS may be used.

Accordingly, since various applications are freely added or deleted on a general purpose OS kernel, a display device described in the present invention, for example, may perform various user-friendly functions. The display device, in more detail, may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
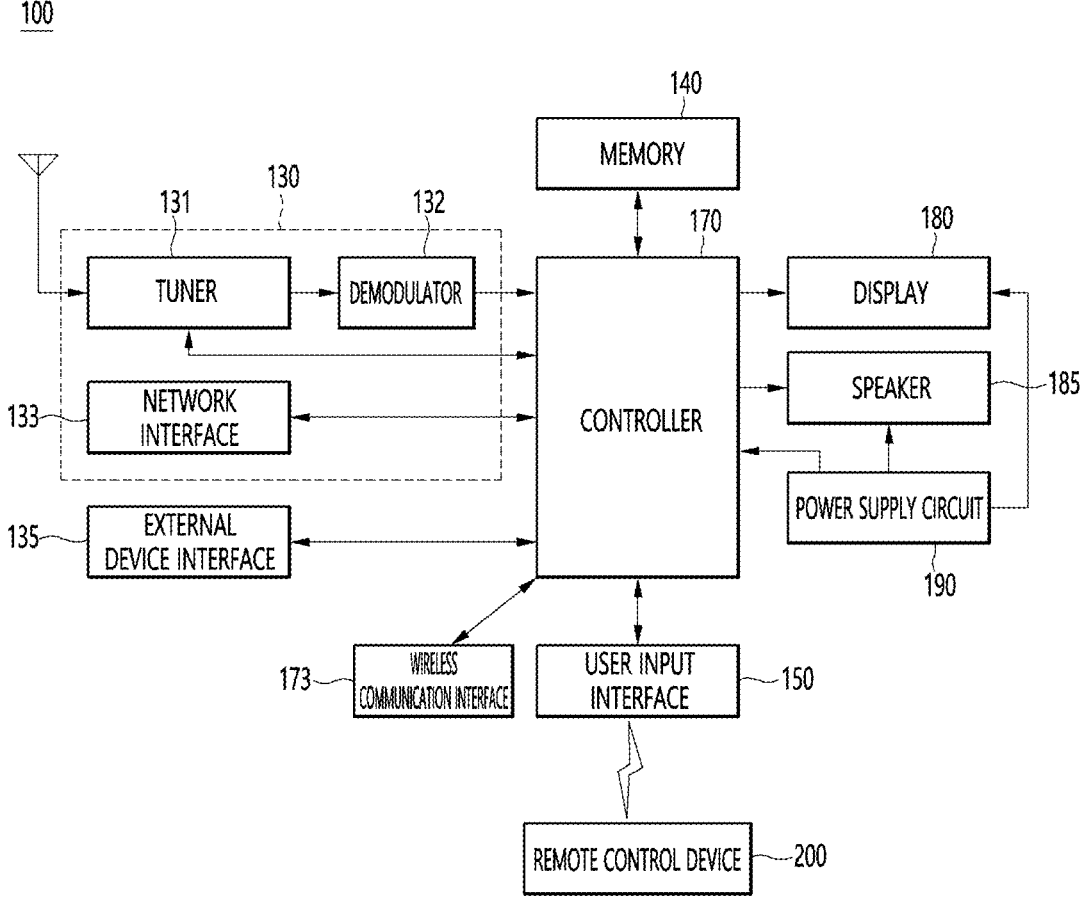
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a controller 170, a wireless communication interface unit 173, a display 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The external device interface unit 135 may receive an application or an application list in an adjacent external device and deliver the application or the application list to the controller 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

The network interface 133 may provide an interface for connecting the display device 100 to a wired/wireless network comprising internet network. The network interface 133 may transmit or receive data to or from another user or another electronic device through an accessed network or another network linked to the accessed network.

Additionally, some content data stored in the display device 100 may be transmitted to a user or an electronic device, which is selected from other users or other electronic devices pre-registered in the display device 100.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The storage unit 140 may store signal-processed image, voice, or data signals stored by a program in order for each signal processing and control in the controller 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the controller 170, or may transmit signals from the controller 170 to a user. For example, the user input unit 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR communication methods.

In addition, the user input unit 150 may transmit, to the controller 170, control signals input from local keys (not shown) such as a power key, a channel key, a volume key, and a setting key.

Image signals that are image-processed by the controller 170 may be input to the display 180 and displayed as images corresponding to the image signals. In addition, image signals that are image-processed by the controller 170 may be input to an external output device through the external device interface unit 135.

Voice signals processed by the controller 170 may be output to the audio output unit 185. In addition, voice signals processed by the controller 170 may be input to the external output device through the external device interface unit 135.

Additionally, the controller 170 may control overall operations of the display device 100.

In addition, the controller 170 may control the display device 100 by a user command or an internal program input through the user input unit 150, and may access the network to download a desired application or application list into the display device 100.

The controller 170 may output channel information selected by a user together with the processed image or voice signals through the display 180 or the audio output unit 185.

In addition, the controller 170 may output image signals or voice signals of an external device such as a camera or a camcorder, which are input through the external device interface unit 135, through the display 180 or the audio output unit 185, according to an external device image playback command received through the user input unit 150.

Moreover, the controller 170 may control the display 180 to display images, and may control the display 180 to display broadcast images input through the tuner 131, external input images input through the external device interface unit 135, images input through the network interface unit, or images stored in the storage unit 140. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. Moreover, the wireless communication unit 173 may perform wired or wireless communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100.

Furthermore, if the sensed wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The display 180 may convert image signals, data signals, or on-screen display (OSD) signals, which are processed in the controller 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display 180 and the audio output unit 185.

A remote control device according to an embodiment of the present disclosure will be described with reference to FIGS. 2 and 3.

Figure 2:
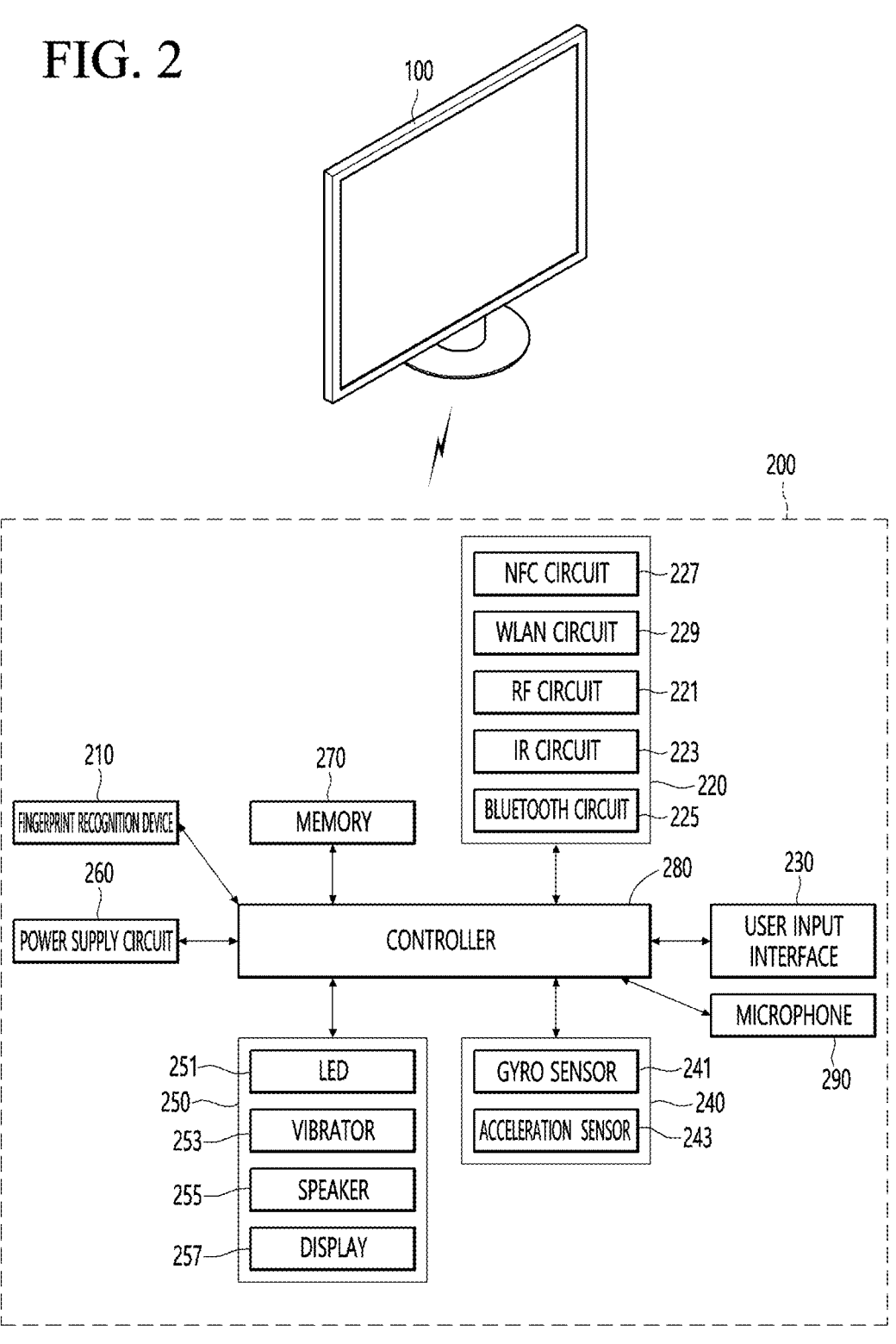
FIG. 2 is a block diagram illustrating a remote control device according to an embodiment of the present disclosure.
Figure 3:
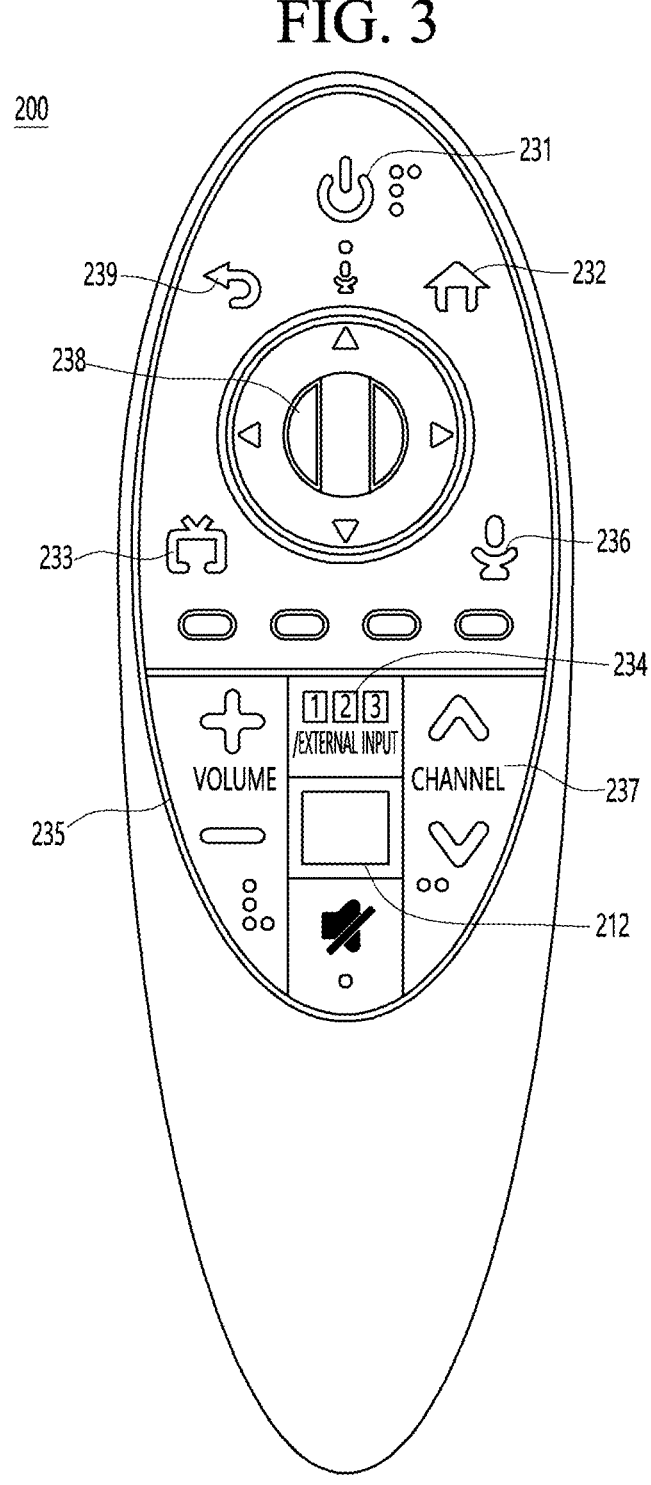
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a controller 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation.

The power button 231 may be a button for turning on/off the power of the display device 100.

The home button 232 may be a button for moving to the home screen of the display device 100.

The live button 233 may be a button for displaying live broadcast programs.

The external input button 234 may be a button for receiving an external input connected to the display device 100.

The volume control button 235 may be a button for controlling a volume output from the display device 100.

The voice recognition button 236 may be a button for receiving user's voice and recognizing the received voice.

The channel change button 237 may be a button for receiving broadcast signals of a specific broadcast channel.

The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display 180 of the display device 100.

The output unit 250 may output image or voice signals in response to the operation of the user input unit 230, or may output image or voice signals corresponding to signals transmitted from the display device 100.

A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced.

The power supply unit 260 may resume the supply of power if a predetermined key provided at the remote control device 200 is operated.

The storage unit 270 may store various kinds of programs and application data required to control or operate the remote control device 200.

If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage unit 270, information on a frequency band for transmitting/receiving signals to/from the display device 100 paired with the remote control device 200 and refer to it.

The controller 280 controls general matters relating to the control of the remote control device 200. The controller 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may be provided in plurality.

Figure 4:
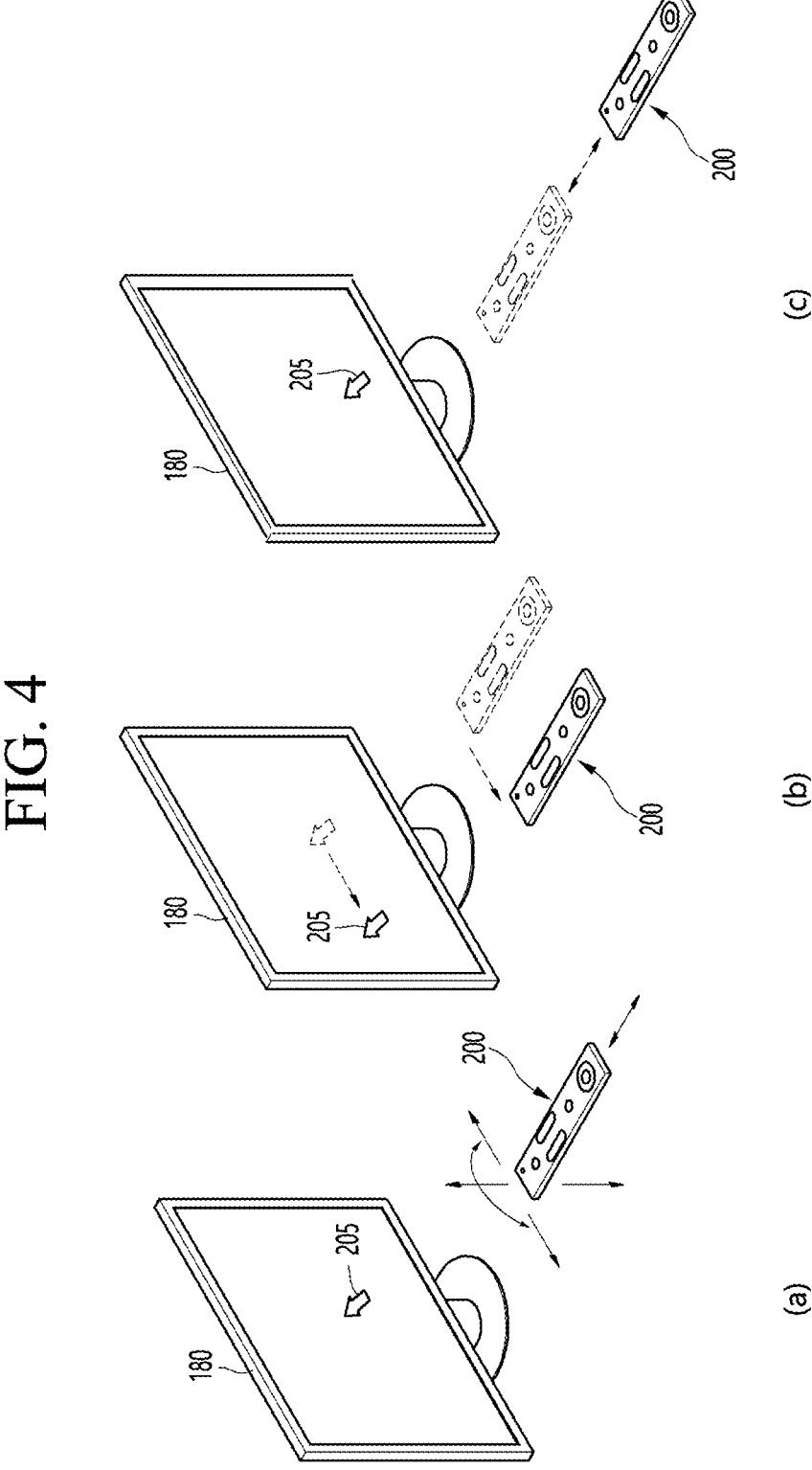
FIG. 4 is a view illustrating an example of utilizing a remote control device according to an embodiment of the present disclosure.

Next, FIG. 4 is described.

FIG. 4 is a view illustrating an example of utilizing the remote control device according to an embodiment of the present disclosure.

FIG. 4(*a*) illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display 180 of the display device 100 is moved to the left according to the movement of the remote control device 200.

Information on a movement of the remote control device 200 sensed through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(c) illustrates that while a specific button in the remote control device 200 is pressed, a user moves the remote control device 200 away from the display 180. Thus, a selected area in the display 180 corresponding to the pointer 205 may be zoomed in and displayed in an enlarged size.

On the other hand, if a user moves the remote control device 200 close to the display 180, a selection area in the display 180 corresponding to the pointer 205 may be zoomed out and displayed in a reduced size.

On the other hand, if the remote control device 200 is moved away from the display 180, a selection area may be zoomed out and if the remote control device 200 is moved closer to the display 180, a selection area may be zoomed in.

Additionally, if a specific button in the remote control device 200 is pressed, recognition of a vertical or horizontal movement may be excluded. That is, if the remote control device 200 is moved away from or closer to the display 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
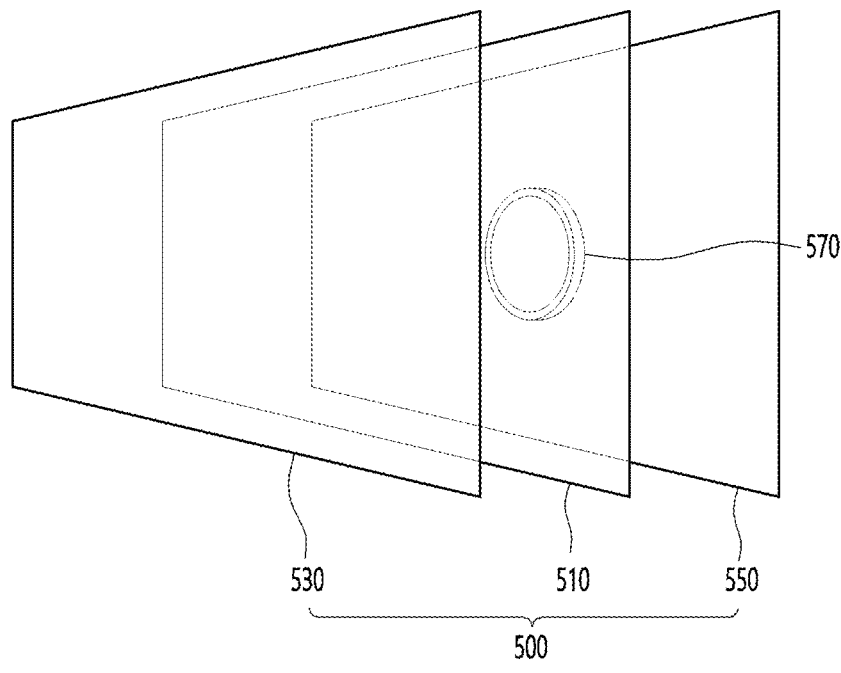
FIG. 5 is a view for explaining a configuration of a transparent display device according to an embodiment of the present disclosure.

FIG. 5 is a view for explaining a configuration of a transparent display device according to an embodiment of the present disclosure.

Referring to FIG. 5, a transparent display device 100 may include a transparent display 500 and a main body 570.

The main body 570 may include a broadcast receiving unit 130, an external device interface 135, a memory 140, a user input interface 150, a controller 170, a wireless communication interface 173, a speaker 185, and a power supply circuit 190 as described in FIG. 1.

The transparent display 500 may perform all functions performed by the display 180 described in FIG. 1.

The transparent display 500 may include a transparent display panel 510, a reinforced glass cover 530, and a transparent back cover 550.

The transparent display panel 510 may be either a projection display type or a transmissive display type.

The projection display type may be a type that uses technologies to display an image by projecting light onto a transparent screen.

The transmissive display type may be a type that uses technologies to change transmittance of a material itself such as an OLED, which emits light.

The transparent display panel 510 may include an OLED panel in which each pixel includes an organic light-emitting diode (OLED). That is, the transparent display panel 510 may have a transparent display type.

The tempered glass cover 530 may be attached to a front surface of the transparent display panel 510 to protect the transparent display panel 510.

The tempered glass cover 530 may be made of transparent glass to protect the transparent display panel 510 from an external impact.

The transparent back cover 550 may be a cover attached to a rear surface of the transparent display panel 510.

The main body 570 may be mounted on a certain area of the transparent back cover 550. A shape of the certain area may be circular, but be only an example, and may have a shape such as a square.

The main body 570 may be connected to a bracket for fixing the transparent display 500 to a wall.

The controller 170 provided in the main body 570 may control transmittance of the transparent display panel 510 by applying an electric signal to the transparent display panel 510.

FIGS. 6a to 6d are views for explaining various types of transparent display devices.

Figure 6A:
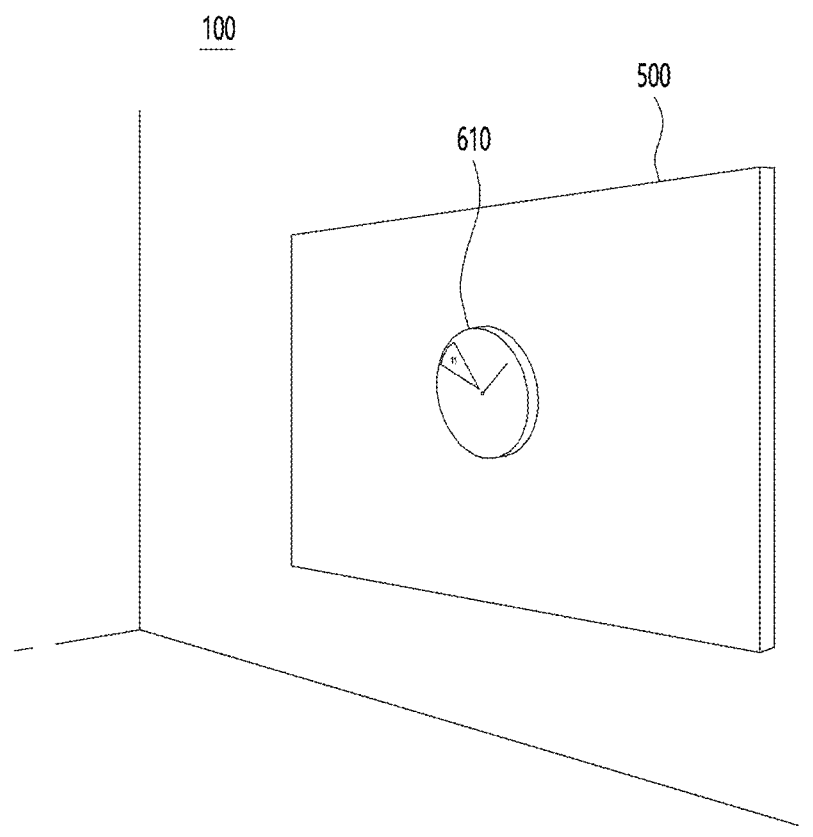
FIGS. 6a to 6d are views for explaining various types of transparent display devices.

FIG. 6a is an embodiment in which the main body 570 is disposed on a central area of the transparent display 500.

The transparent display 500 may display information on a first area 610 corresponding to a position of the main body 570.

One or more of time information, weather information, and schedule information may be displayed on the first area 610. An always on display (AOD) function may be applied on the first area 610 to display information.

Figure 6B:
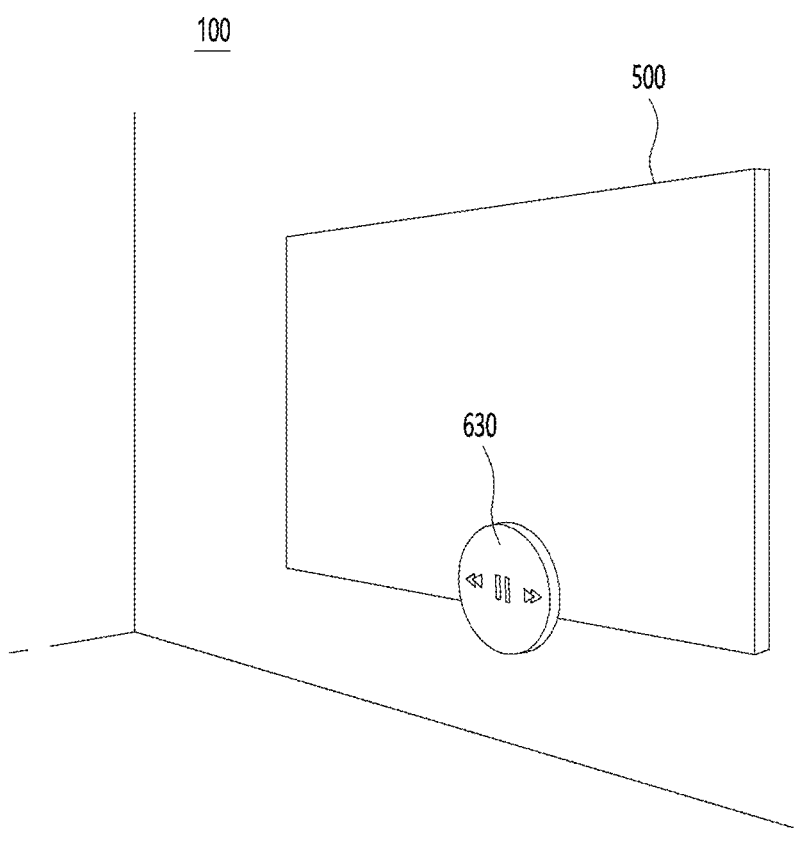

FIG. 6b is an embodiment in which the main body 570 is disposed in a lower area of the transparent display 500.

A portion of the main body 570 may be exposed to a lower end of the transparent display 500.

The transparent display 500 may display music playback information on a second area 630 corresponding to the position of the main body 570. The main body 570 may be provided with a speaker, and the speaker may play music.

The user may view information about the music being played through the second area 630. In addition, the user may control the music playback through the music playback information displayed on the second area 630 through a remote control device 200.

Figure 6C:
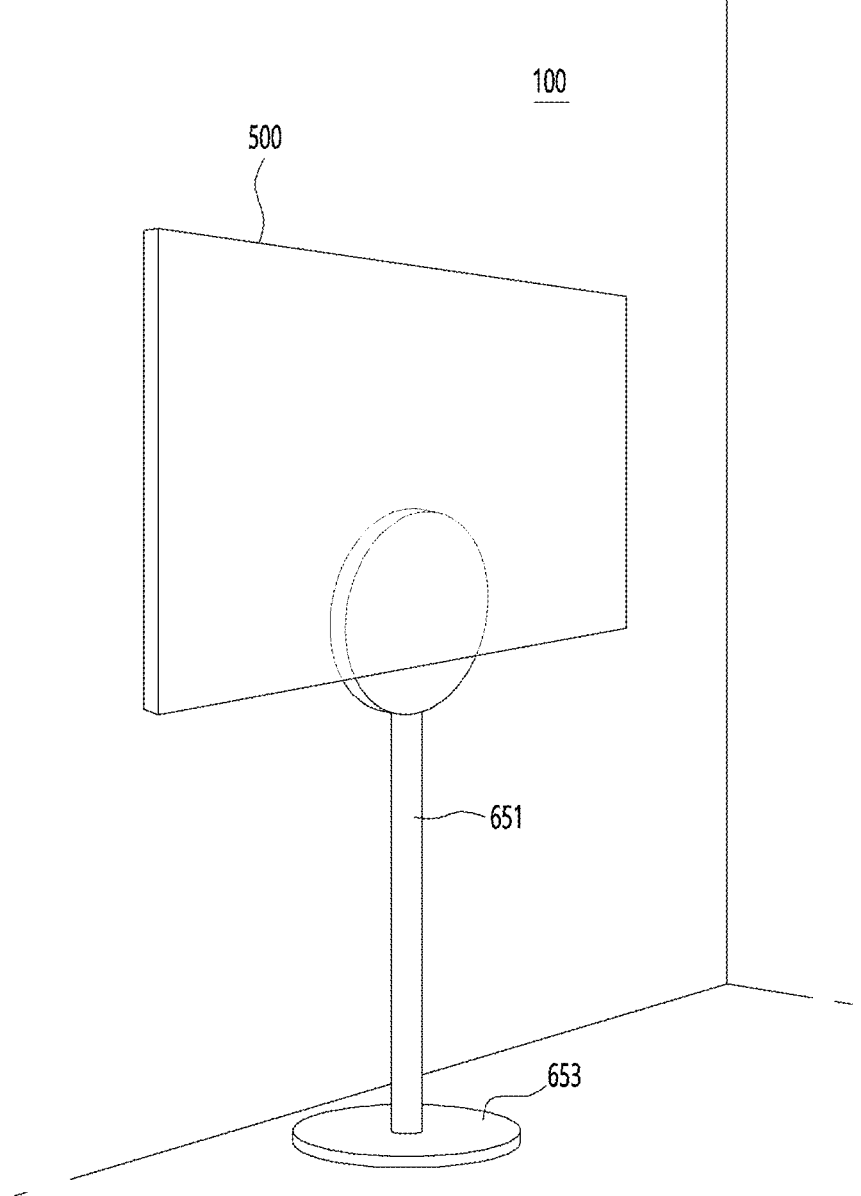

FIG. 6c is an embodiment for explaining a structure in which the main body 570 is connected to a stand 651.

In FIG. 6c, the main body 570 may not be fixed to the wall, but be fixed by being connected to the stand 651. The stand 651 may be connected to a base 653 that serves as a support for the floor.

Figure 6D:
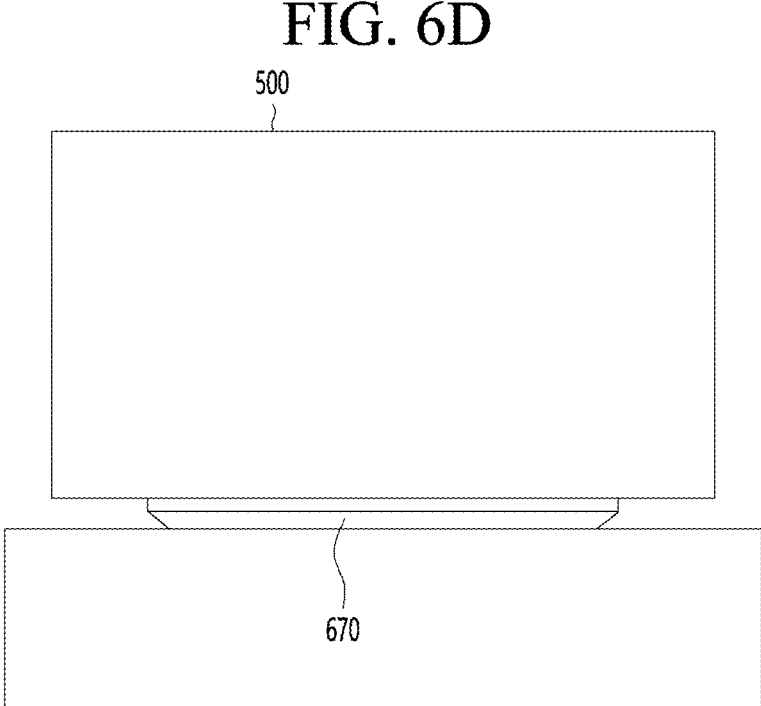

FIG. 6d illustrates the transparent display 500 disposed on a living room dresser. The transparent display 500 may be disposed on a top surface of the living room dresser through a support 670.

Figure 7:
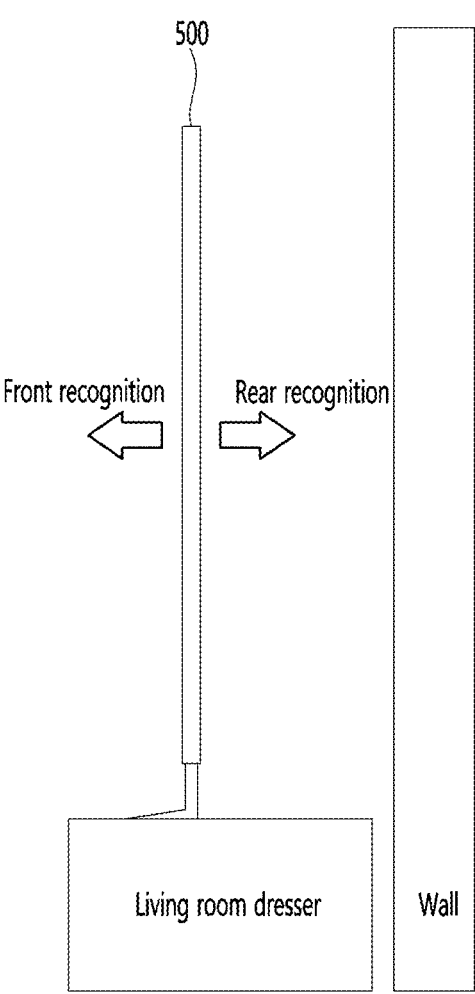
FIG. 7 is a view for explaining a structure of a side surface of the transparent display device according to the present disclosure.

FIG. 7 is a view for explaining a structure of a side surface of the transparent display device according to the present disclosure.

In FIG. 7, it is assumed that the display device 100 is disposed on the upper surface of the living room dresser as described in FIG. 6d.

A camera (not shown) may be disposed on the transparent display 500 to recognize an object disposed on the front or rear surface. For this, the camera may be provided with a front camera that senses an object at a front and a rear camera that senses an object at a rear side.

The object may be either a user or an object.

Figure 8:
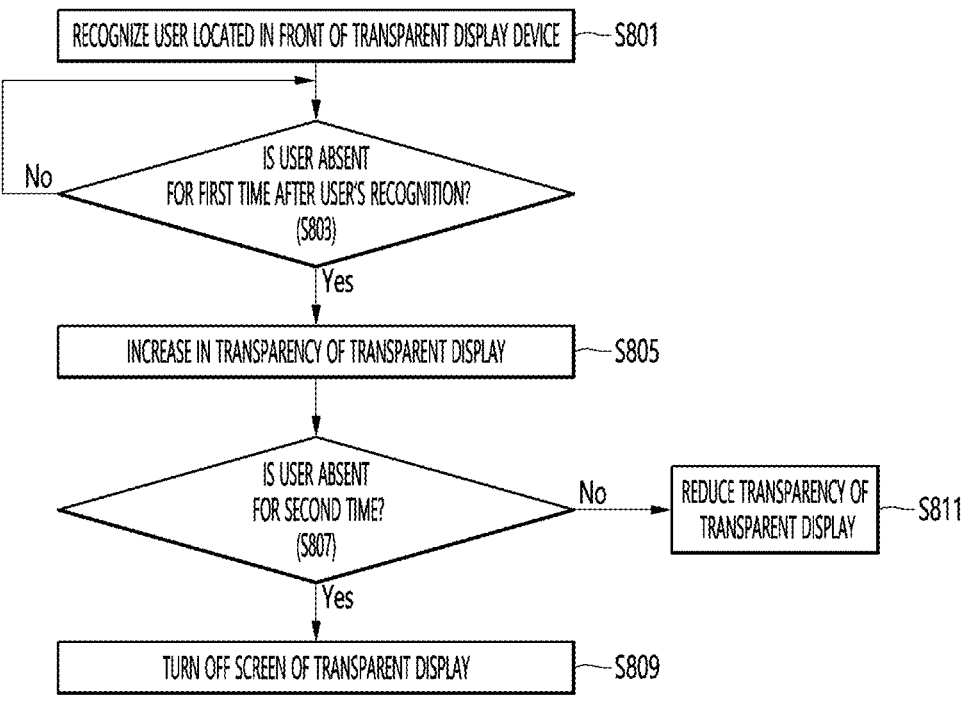
FIG. 8 is a flowchart for explaining a method for operating a transparent display device according to an embodiment of the present disclosure.

FIG. 8 is a flowchart for explaining a method for operating a transparent display device according to an embodiment of the present disclosure.

A controller 170 of a transparent display device 100 recognizes a user located in front of the transparent display device 100 (S801).

The controller 170 may capture a front side of a transparent display 500 through a front camera disposed on the transparent display 500.

The controller 170 may determine whether a user is sensed on the basis of the captured front image. The controller 170 may determine whether an object included in the captured image is a person using an image recognition model stored in a memory 140.

The image recognition model may be an artificial neural network-based model that outputs object identification information from image data.

A variety of known technologies may be used to recognize the user on the basis of the image.

The controller 170 may determine that the user has been recognized if an output of the image recognition model includes information that identifies a person.

The controller 170 determines whether an absence of the user is sensed for a first time after the recognition of the user (S803).

The controller 170 may determine whether the user is absent for a first time on the basis of the image captured through the front camera. The first time may be 10 seconds, but is only an example.

The controller 170 increases in transparency of the transparent display 500 when the absence of the user is sensed for the first time (S805).

In an embodiment, the controller 170 may apply an electric signal to the transparent display 500 to increase in transparency of the transparent display 500 when the absence of the user is sensed for the first time.

The controller 170 may transmit an electric signal to the transparent display 500 to increase in transparency, thereby reducing a light-blocking effect of the transparent display 500 when the absence of the user is sensed for the first time.

When a content image is played on a transparent display 500, the content image may be displayed faintly as the transparency increases.

The controller 170 may gradually increase in transparency of the transparent display 500.

The controller 170 determines whether the user's absence is maintained for a second time after the first time is elapsed (S807).

In an embodiment, the second time may be equal to the first time or may be less than the first time.

For example, if the first time is 10 seconds, the second time may be 5 seconds.

The controller 170 may continuously sense the presence of the user by using the image captured through the front camera.

The controller 170 turns off the screen of the transparent display 500 when the user's absence is maintained for the second time after the first time is elapsed (S809).

The controller 170 may send an OFF signal to the transparent display 500 to turn off the screen of the transparent display 500 when the user's absence is maintained for the second time.

That is, the controller 170 may turn off the screen of the transparent display 500 to reduce power consumption when the user is not present in front of the transparent display 500 for a certain time.

If the controller 170 senses that the user is present again for the second time after the first time is elapsed (S807), the controller 170 reduces the transparency of the transparent display 500 (S811).

That is, the controller 170 may reduce the transparency of the transparent display 500 so that the content image is displayed normally when the user is re-sensed in front of the transparent display 500.

The controller 170 may gradually reduce the transparency of the transparent display 500.

The controller 170 may adjust the transparency of the transparent display 500 to 0 when the user is sensed in front of the transparent display 500.

Figure 9A:
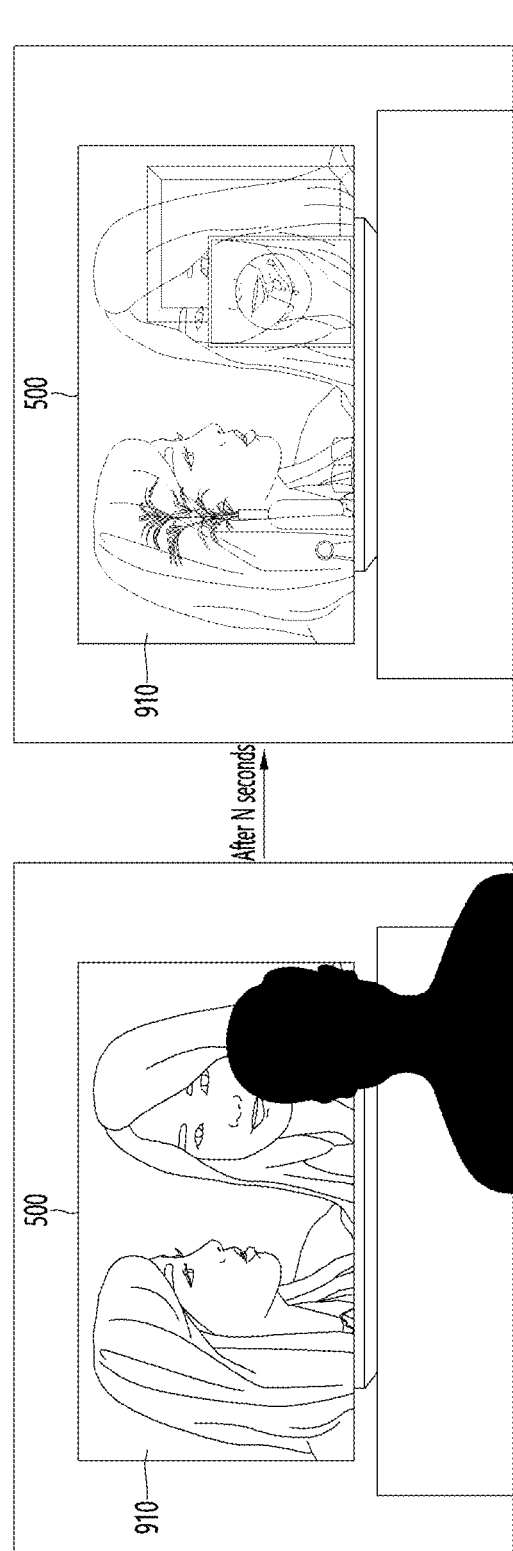
FIGS. 9a to 9c are views for explaining an example in which transparency of a transparent display by recognizing an absence or presence of a user located in front of the transparent display.
Figure 9B:
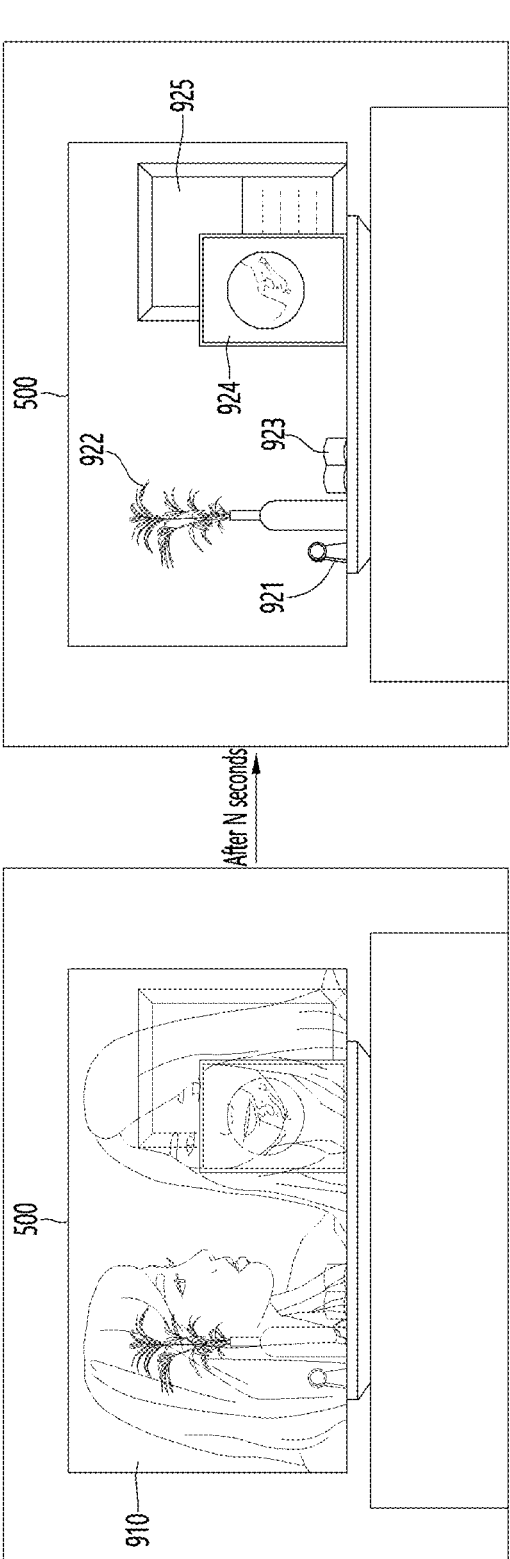
Figure 9C:
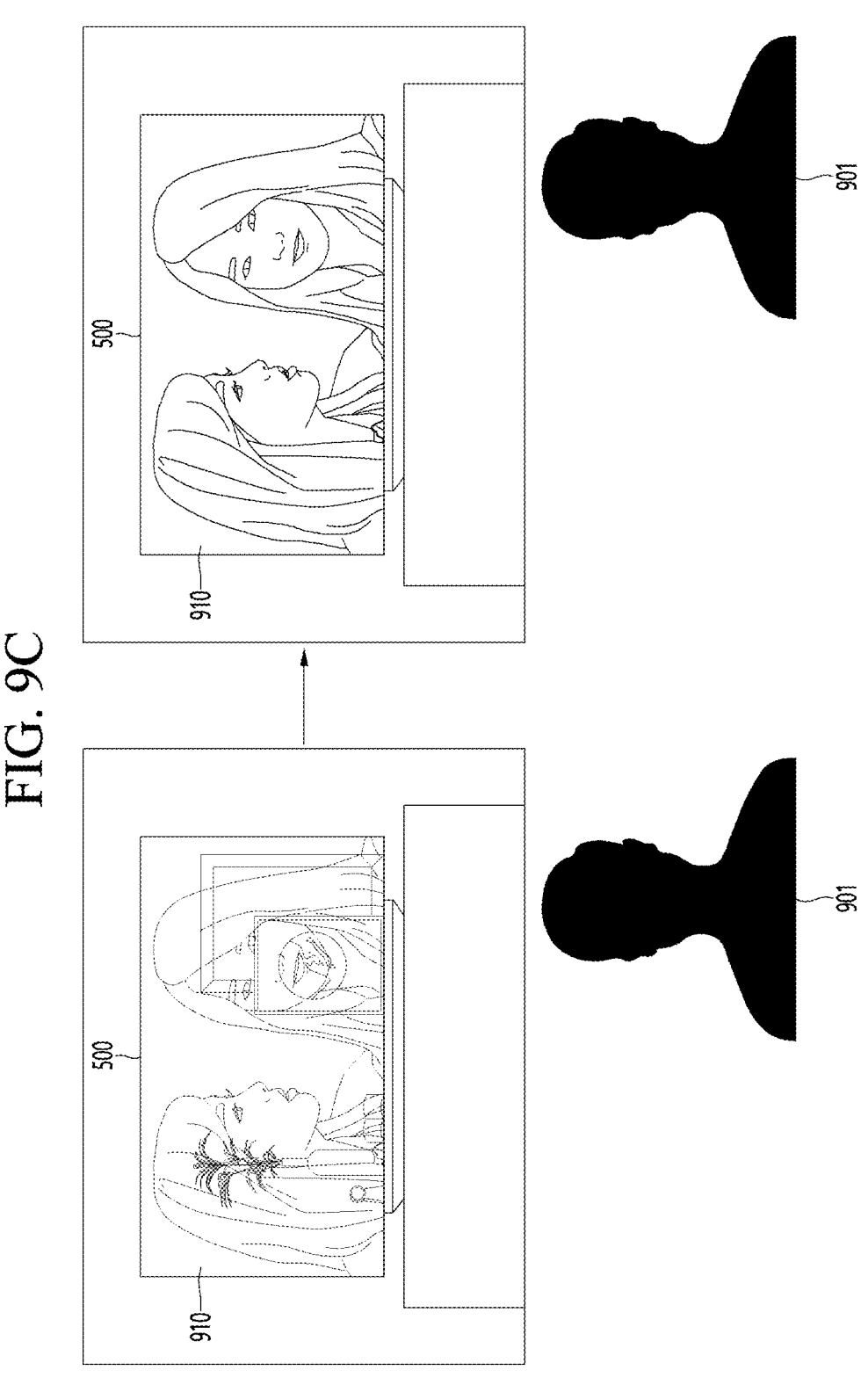

FIGS. 9a to 9c are views for explaining an example in which transparency of a transparent display by recognizing an absence or presence of a user located in front of the transparent display.

Referring to FIG. 9a, the transparent display 500 is playing a content image 910.

The controller 170 may sense a user 901 located in front of the transparent display 500 using an image captured through a front camera (not shown).

The front camera may be a component of the transparent display device 100, but may also be provided separately from the transparent display device 100.

If the front camera is provided separately from the transparent display device 100, the front camera may be connected to an external device interface 135. The controller 170 may receive an image from the front camera connected to the external device interface 135 to sense a presence of the user using the received image.

The controller 170 may continuously acquire images. The controller 170 may increase in transparency of the transparent display 500 when the user's absence is maintained for N seconds using the image. As the transparency increases, the content image 910 may be displayed faintly.

In an embodiment, the controller 170 may increase in transparency of the transparent display 500 to a maximum value, as illustrated in FIG. 9b, when the absence of the user is maintained for N seconds after N seconds is elapsed. The transparency may range from 0 to 100, and the maximum value of the transparency may be 100.

In another embodiment, the controller 170 may turn off the transparent display 500 if the user's absence is maintained for N seconds after N seconds is elapsed.

Thus, a plurality of objects 921 to 925 placed at a rear side of the transparent display 500 may be exposed.

In an embodiment, the controller 170 may gradually reduce the transparency of the transparent display 500 as illustrated in FIG. 9c when the presence of the user 901 is sensed after N seconds is elapsed.

As described above, according to an embodiment of the present disclosure, light blocking of the transparent display 500 may be automatically adjusted depending on the presence or absence of the user located in front of the transparent display 500.

Thus, usability of the transparent display 500 may increase, and a user experience may be improved.

Figure 10:
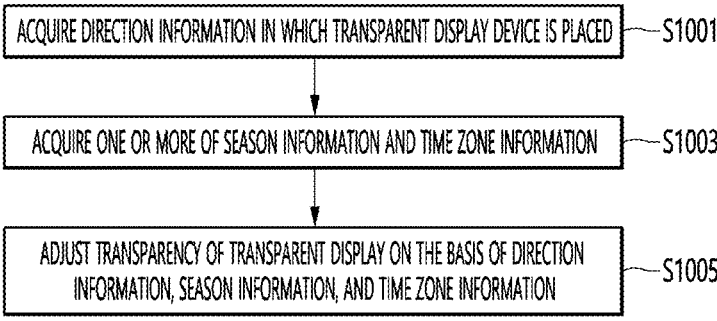
FIG. 10 is a flowchart for explaining a method for operating a transparent display device according to another embodiment of the present disclosure.

FIG. 10 is a flowchart for explaining a method for operating a transparent display device according to another embodiment of the present disclosure.

In particular, FIG. 10 is an example of adjusting the transparency of the transparent display 500 by considering a direction, in which the transparent display device 100 is placed, a time zone, and a season.

Referring to FIG. 10, the controller 170 acquires information on the direction, in which the transparent display device 100 is placed, through a direction sensor (not shown) (S1001).

The direction sensor may sense information about the direction in which the transparent display device 100 is placed. Specifically, the direction sensor may sense information indicating which direction the transparent display device 100 is facing among east, west, south, or north.

The direction sensor may be a sensor having a compass function.

The controller 170 acquires at least one of seasonal information or time zone information (S1003).

The seasonal information may include information indicating whether the current time corresponds to a season of spring/summer/fall/winter.

The time zone information may include a morning time zone, an afternoon time zone, and an evening time zone. The morning time zone may be from 6:00 AM to 12:00 PM (noon), the afternoon time zone may be from 12:00 PM (noon) to 6:00 PM, and the evening time zone may be from 6:00 PM to 6:00 AM.

The controller 170 adjusts the transparency of the transparent display 500 on the basis of one or more of the direction information, the season information, or the time zone information (S1005).

The controller 170 may gradually reduce the transparency of the transparent display 500 when a front surface of the transparent display 500 faces north, and the time zone moves from morning to noon. The controller 170 may reduce the transparency to a maximum value when the time zone is noon.

This is because when the time zone is noon, an amount of sunlight directed toward the transparent display 500 becomes at its maximum.

The controller 170 may gradually increase in transparency of the transparent display 500 when the front surface of the transparent display 500 faces north, and the time zone is from noon to afternoon.

The controller 170 may increase in transparency of the transparent display 500 more in winter than in summer.

Figure 11:
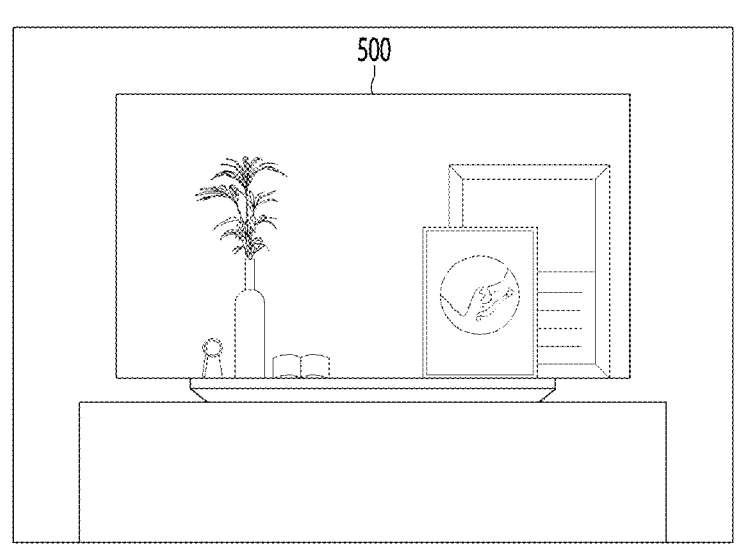
FIG. 11 is a view for explaining a specific example of FIG. 10.
Figure 11:
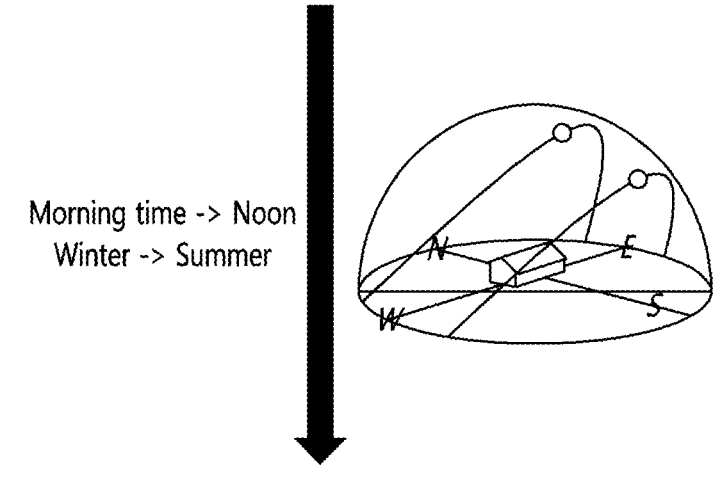
Figure 11:
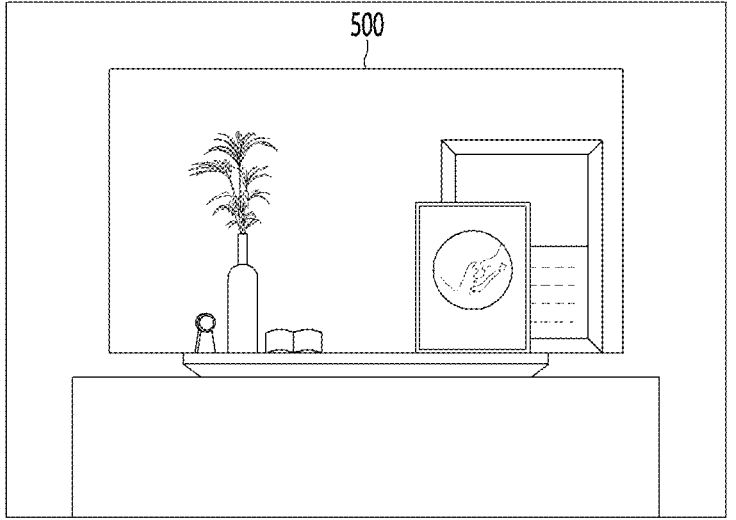

FIG. 11 is a view for explaining a specific example of FIG. 10.

Referring to FIG. 11, it is assumed that a front side of the transparent display 500 of the transparent display device 100 faces north. That is, the user is sat at north to face the transparent display 500 toward south.

The transparent display device 100 may reduce the transparency of the transparent display 500 when the time zone moves from morning to noon.

As another example, the transparent display device 100 may further reduce the transparency of the transparent display 500 in the summer compared to when the season is winter.

As described above, according to the embodiment of the present disclosure, a degree of the light blocking may vary depending on the direction, in which the transparent display device 100 is placed, the time zone, and the season to prevent a view from being obstructed by the sunlight.

An embodiment of FIGS. 10 and 11 may be applied when the user is recognized in front of the transparent display 500. That is, the embodiment of FIGS. 10 and 11 may be an embodiment in which the user continues to exist after the user's recognition according to the operation S801 in the embodiment of FIG. 8.

Figure 12:
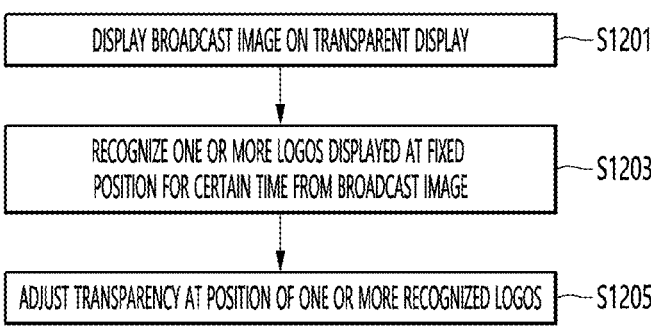
FIG. 12 is a flowchart for explaining a method for operating a transparent display device according to further another embodiment of the present disclosure.

FIG. 12 is a flowchart for explaining a method for operating a transparent display device according to further another embodiment of the present disclosure.

In particular, FIG. 12 is an example of adjusting transparency of an area on which a logo is displayed when an image includes the logo.

Referring to FIG. 12, the controller 170 displays a broadcast image on the transparent display 500 (S1201).

The controller 170 recognizes one or more logos displayed at a fixed position for a certain time from the broadcast image (S1203).

The controller 170 may recognize a portion corresponding to the corresponding transparent OLED pixels as a logo when the transparent display 500 is constituted by transparent OLED pixels, and the same image data is input to the transparent OLED pixels for a certain time.

That is, the controller 170 may sense a logo displayed for a certain time at a fixed position on the broadcast image.

The controller 170 may extract a logo area including the sensed logo.

The controller 170 may adjust transparency of an area on which one or more recognized logos are displayed (S1205).

In an embodiment, the controller 170 may increase in transparency of the area on which one or more recognized logos are displayed. That is, the controller 170 may increase in transparency of the area on which the logo is displayed and maintain the transparency of the remaining areas.

As the transparency of the logo area increases, it may not disturb the user's viewing. In addition, as the transparency of the logo area increases, burn-in of the corresponding transparent OLED pixels may be prevented.

Figure 13:
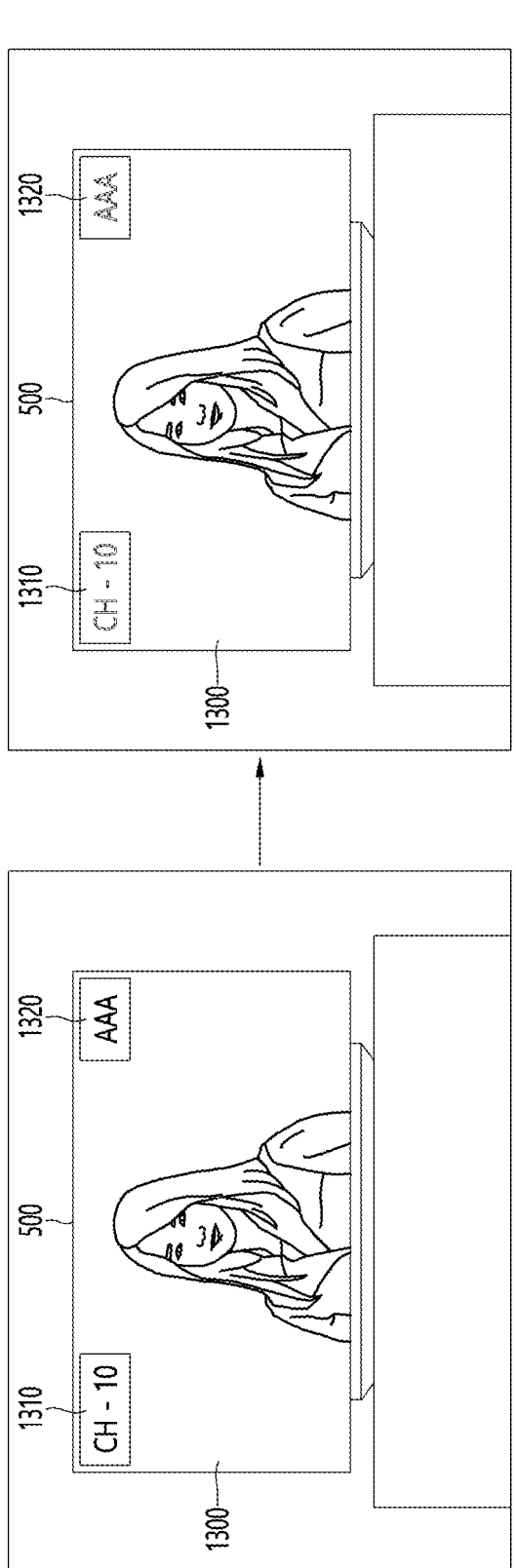
FIG. 13 is a view for explaining an example in which transparent of a logo portion of a broadcast image according to an embodiment of the present disclosure.

FIG. 13 is a view for explaining an example in which transparent of a logo portion of a broadcast image according to an embodiment of the present disclosure.

Referring to FIG. 13, the transparent display 500 is displaying a broadcast image 1300.

The broadcast image 1300 may include a first partial image 1310 and a second partial image 1320.

The controller 170 may recognize each of the first partial image 1310 and the second partial image 1320 as a logo image when each of the first partial image 1310 and the second partial image 1320 is displayed at a fixed position for a preset time.

The controller 170 may increase in transparency of each of the area on which the first partial image 1310 is displayed, and the area on which the second partial image 1320 is displayed. The controller 170 may maintain the transparency of an area other than the area on which the first partial image 1310 is displayed and the area on which the second partial image 1320 is displayed, and increase in transparency of each of the area on which the first partial image 1310 is displayed and the area on which the second partial image 1320 is displayed.

The controller 170 may control the transparency of the first partial image 1310 to be greater than the transparency of the second partial image 1320 when the first partial image 1310 includes a channel number, and the second partial image 1320 includes a channel name.

This is because the channel name is generally more helpful to the user in identifying the broadcast image than the channel number.

If the first partial image 1310 includes the name of the broadcast image, and the second partial image 1320 includes the name of the channel, the controller 170 may control the transparency of the first partial image 1310 to be smaller than the transparency of the second partial image 1320.

This is because the name of the broadcast image may help the user to identify the broadcast image better than the channel name.

According to an embodiments of FIGS. 12 and 13, a portion that interferes with the user's viewing of the broadcast image may be minimized, and a burn-in phenomenon of the transparent OLED pixels at the corresponding portion may be prevented.

An embodiment of FIGS. 12 and 13 may be applied when the user is recognized in front of the transparent display 500. That is, the embodiment of FIGS. 12 and 13 may be an embodiment in which the user continues to exist after the user's recognition according to the operation S801 in the embodiment of FIG. 8.

According to the embodiments of the present disclosure, the above-described method may also be embodied as processor readable codes on a processor readable recording medium. Examples of the processor readable medium include read-only memory (ROM), random-access memory (RAM), CD-ROMs, magnetic tapes, floppy disks, and optical data storage devices.

The display device described above is not limited to the configuration and method of the embodiments described above, and the embodiments may be configured by selectively combining all or portion of the embodiments so that various modifications may be made.

What is claimed is:

1. A transparent display device comprising:

a transparent display;

a camera; and a controller configured to:

recognize a user located in front of the transparent display based on an image captured through the camera;

increase transparency of the transparent display when an absence of the user is sensed during a first time after the recognition of the user;

obtain direction information regarding a direction in which the transparent display device is placed, time zone information regarding a time zone, and season information;

adjust the transparency of the transparent display based on one or more of the direction information, the time zone information, or the season information when a presence of the recognized user is continuously sensed after the recognition of the user;

gradually decrease the transparency of the transparent display when a front surface of the transparent display faces north, and the time zone moves from morning to noon; and gradually increase the transparency of the transparent display when the front surface of the transparent display faces north, and the time zone moves from noon to afternoon.

2. The transparent display device according to claim 1, wherein the controller is configured to turn off a screen of the transparent display when the absence of the user is sensed for a second time after the first time is elapsed.

3. The transparent display device according to claim 1, wherein the controller is configured to adjust the transparency of the transparent display to a maximum value when the absence of the user is sensed for a second time after the first time is elapsed.

4. The transparent display device according to claim 3, wherein the controller is configured to decrease the transparency of the transparent display when the presence of the user is sensed for the second time after the first time is elapsed.

5. The transparent display device according to claim 1, wherein the controller is configured to:

extract a partial image displayed for a certain time at a fixed position from the image displayed on the transparent display; and increase transparency of the extracted partial image when the presence of the recognized user is continuously sensed after the recognition of the user.

6. A method for operating a transparent display device, the method comprising:

recognizing a user located in front of a transparent display based on an image captured by a camera;

increasing transparency of the transparent display when an absence of the user is sensed during a first time after the recognition of the user;

obtaining direction information regarding a direction in which the transparent display device is placed, time zone information regarding a time zone, and season information; and adjusting the transparency of the transparent display based on one or more of the direction information, the time zone information, or the season information when a presence of the recognized user is continuously sensed after the recognition of the user, wherein adjusting the transparency of the transparent display comprises:

gradually decreasing the transparency of the transparent display when a front surface of the transparent display faces north, and the time zone moves from morning to noon; and gradually increasing the transparency of the transparent display when the front surface of the transparent display faces north, and the time zone moves from noon to afternoon.

7. The method according to claim 6, further comprising turning off a screen of the transparent display when the absence of the user is sensed for a second time after the first time is elapsed.

8. The method according to claim 6, further comprising adjusting the transparency of the transparent display to a maximum value when the absence of the user is sensed for a second time after the first time is elapsed.

9. The method according to claim 8, further comprising decreasing the transparency of the transparent display when the presence of the user is sensed for the second time after the first time is elapsed.

10. The method according to claim 6, further comprising:

extracting a partial image displayed for a certain time at a fixed position from the image displayed on the transparent display; and increasing transparency of the extracted partial image when the presence of the recognized user is continuously sensed after the recognition of the user.

* * * * *